(12) United States Patent
Singhal et al.

(10) Patent No.: US 9,306,964 B2
(45) Date of Patent: Apr. 5, 2016

(54) USING TRUST PROFILES FOR NETWORK BREACH DETECTION

(71) Applicant: NetScout Systems, Inc., Westford, MA (US)

(72) Inventors: Anil K. Singhal, Carlisle, MA (US);
Shu Nakamoto, Merrimack, NH (US);
Deborah Briggs, Litchfield, NH (US)

(73) Assignee: Netscout Systems, Inc., Westford, MA (US)

(*) Notice: Subject to any disclaimer, the term of this patent is extended or adjusted under 35 U.S.C. 154(b) by 0 days.

(21) Appl. No.: 14/642,901

(22) Filed: Mar. 10, 2015

(65) Prior Publication Data
US 2015/0288709 A1 Oct. 8, 2015

Related U.S. Application Data

(60) Provisional application No. 61/975,410, filed on Apr. 4, 2014.

(51) Int. Cl.
*H04L 29/06* (2006.01)

(52) U.S. Cl.
CPC .......... *H04L 63/1416* (2013.01); *H04L 63/102* (2013.01); *H04L 63/1408* (2013.01); *H04L 63/1441* (2013.01)

(58) Field of Classification Search
CPC .............. H04L 63/1416; H04L 63/102; H04L 63/1408; H04L 63/1441
USPC ......................................................... 726/23
See application file for complete search history.

(56) References Cited

U.S. PATENT DOCUMENTS

| | | | |
|---|---|---|---|
| 5,796,942 A | 8/1998 | Esbensen | |
| 8,230,505 B1 | 7/2012 | Ahrens et al. | |
| 8,582,454 B2 | 11/2013 | Singhal et al. | |
| 2002/0144156 A1* | 10/2002 | Copeland, III | 713/201 |
| 2003/0088529 A1 | 5/2003 | Klinker et al. | |
| 2003/0145226 A1 | 7/2003 | Bruton, III et al. | |
| 2006/0026682 A1 | 2/2006 | Zakas | |
| 2007/0261112 A1* | 11/2007 | Todd et al. | 726/11 |
| 2011/0219375 A1* | 9/2011 | Chang et al. | 718/100 |
| 2014/0101305 A1 | 4/2014 | Kelley | |

OTHER PUBLICATIONS

PCT International Search Report and Written Opinion, PCT Application No. PCT/US2015/020127, Jun. 25, 2015, nine pages.

* cited by examiner

*Primary Examiner* — William Goodchild
(74) *Attorney, Agent, or Firm* — Fenwick & West LLP

(57) ABSTRACT

Actions of servers and other network devices within a network are monitored to detect whether the servers and network devices are performing tasks, using protocols, and communicating through ports that are consistent with legitimate (or "permissible") purposes. That is, rather than attempting to belatedly identify malware signatures and screen all traffic into and out of a network for these signatures, embodiments of the present invention scrutinize devices (such as servers and other network infrastructure elements) for malware behavior that is inconsistent with an identified set of actions known to be consistent with legitimate tasks performed by the network device.

21 Claims, 8 Drawing Sheets

Allowable Exception Policy
(applied if all permissible use rules fail)
230

| Host Name | Westford SFTP1 204 |
|---|---|
| Local IP address (assigned) | 192.168.129.57 206 |

| Rule 1 236 | Remote IP Address: 10.25.35.45 238 | Protocol: TCP 240 | Remote Ports: 22 242 | Local Ports: 49152-65535 244 |
| Rule 2 246 | Remote IP Address: 10.25.35.46 | Protocol: TCP | Remote Ports: 12000-15000 | Local Ports: 49152-65535 |
| Additional rules to include 248 | DNS, AUTH, SSO, SWU, AV | Note: These are "canned" profiles for common services used by protected servers. | | |

Acceptable Business Practice Policy
(evaluate if permissible use or allowable exceptions indicate traffic is legitimate)
250

| Host Name | Westford SFTP1 204 |
|---|---|
| Local IP address (assigned) | 192.168.129.57 206 |

Rule 1
Remote_Host exceptions
129.73.24.xxx
A list of IP addresses indicates a set of remote hosts (e.g., a whitelist) that are exempt from acceptable business practice rules (ABP). Enables ABP for all except whitelisted hosts.
252

Rule 2
Max transfer to single client
2 GB/hr
Exceeding parameter for identified local host generates policy violation alert.
254

Rule 3
Max transfer from a server (to all remote hosts)
10 GB/24 hr
Exceeding parameter for identified device (independent of accessing client) generates policy violation alert.
258

Rule 4
Hours of operation
0730-1800 (GMT-5)
For identified device, transceiving traffic outside indicated hours generates policy violation alert.
262

Rule 5
Remote blacklist domains
IP addresses/
domain names
Functions as blacklist (access prohibited from identified local hosts). If domain names identified, alert generated when detected remote IP address resolved to identified domain name.
266

Rule 6
Remote access restrictions
Requires shell control box to manage and audit remote SSH session.
A shell control box is an administration protocol inspection tool that ensures remote access is being properly handled and logged. Non-approved SSH sessions (i.e., malware "calling home") generate a policy violation alert.
270

USING TRUST PROFILES FOR NETWORK BREACH DETECTION

CROSS REFERENCE TO RELATED APPLICATIONS

This application claims the benefit of U.S. Provisional Application No. 61/975,410, filed Apr. 4, 2014, which is incorporated by reference in its entirety.

TECHNICAL FIELD

The present disclosure relates generally to breach detection and network security. Specifically, the present disclosure relates to trust profiles for network breach detection.

BACKGROUND

Traditional network security methods use "malware signatures" or "malicious behaviors" derived from a specific threat or threat type to scan a component of a network (such as a client device or server) or data incoming to the network (such as an incoming email or a downloaded file) for the specific malware signature. In this way, known threats that enter, or are present within, a network are found and removed.

However, not all malware can be identified and analyzed in a timely manner. As with biological viruses, computer viruses evolve (whether through polymorphic design concepts or direct developer intervention) and adapt to the countermeasures used to suppress them. As a result, not all malware has a corresponding signature needed to protect a network from infection. This evolution mechanism (as well as other mechanisms) leads to a false-negative inspection result in which malware (or a transmission that includes malware) is identified as safe. This example illustrates that malware signature generation and maintenance is not only difficult and resource intensive, but also inaccurate in that the signatures often lag the threats.

Furthermore, traditional signature-based network security protocols are known to not be completely effective in light of the increasingly open and ubiquitous use of mobile computing devices on multiple networks. For example, a device (e.g., a laptop or tablet) associated with a network protected by traditional signature-based security protocols can also easily be used outside of a network. If the device is infected, it can become a vector for transmitting the infection to other systems attached to the network upon reconnection.

As alluded above, generating malware signatures and applying the signatures to protect a network is resource intensive. Generally, creating malware signatures uses significant computing analysis and engineering to identify the various threats and generate corresponding signatures. Once created, most (if not all) client-level transmissions into and out of a network are monitored to identify whether malware is present. This client-level monitoring consumes a significant amount of computing resources. Furthermore, many false-positive detections are generated from signatures that incorrectly identify legitimate traffic as malware, thus consuming even more computing resources.

As a result, despite the significant effort used to generate and maintain malware signatures, expand knowledge of malicious behaviors, and respond to false-positive malware detections, networks, and systems and devices connected thereto, are still infected because of the inherent deficiencies in conventional network protection methods.

SUMMARY

Embodiments of the present disclosure monitor actions of servers and other network devices within a network to detect whether the servers and network devices are performing tasks, using protocols, and communicating through ports that are consistent with legitimate (or "permissible") purposes. That is, rather than attempting to belatedly identify malware signatures and screen all traffic into and out of a network for these signatures, embodiments of the present disclosure scrutinize devices (such as servers and other network infrastructure elements) for malicious behavior that is inconsistent with an identified set of actions known to be consistent with legitimate tasks performed by the network device.

BRIEF DESCRIPTION OF THE DRAWINGS

FIG. 2B is a graphical illustration of network parameters used to generate allowable exceptions of a permissible use policy of a trust profile of a network device, in an embodiment.

FIG. 2C is a graphical illustration of network parameters used to generate a trust profile establishing acceptable business practices of a permissible use policy of a trust profile corresponding to a network device, in an embodiment.

Figure 1:
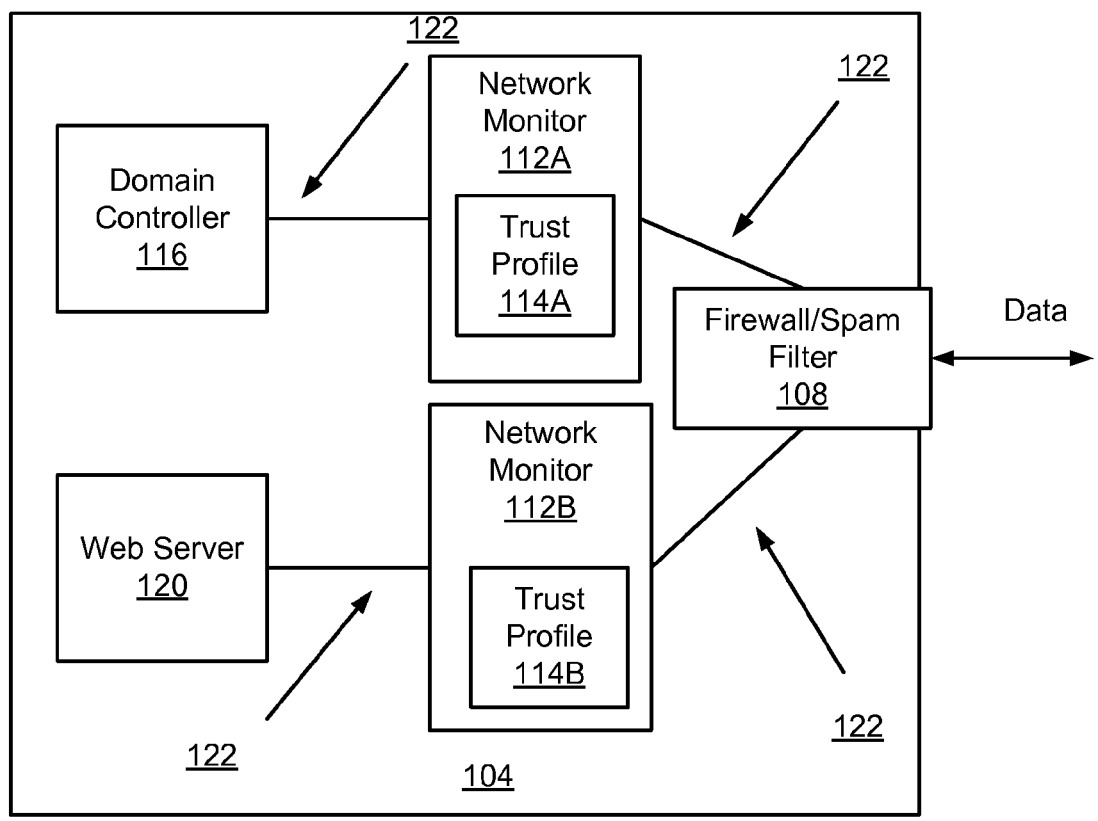
FIG. 1 is a schematic diagram of a network including traditional network security measures and network monitors for executing methods of the present disclosure, in an embodiment.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Overview

Unlike conventional malware detection methods, embodiments of the present disclosure monitor actions of servers and other network devices within a network to detect whether the servers and network devices are performing tasks, using protocols, and communicating through ports that are consistent with legitimate (also referred to as "permissible") purposes. That is, rather than attempting to (belatedly) identify malware signatures and screen all traffic into and out of a network for these signatures, embodiments of the present disclosure scrutinize devices (such as servers and other network infrastructure elements) for behavior that is inconsistent with an identified set of actions known to be consistent with legitimate tasks (i.e., tasks not instructed to be executed by a third party malware infection) performed by the network device. In one example, the identified set of actions known to be consistent with legitimate tasks is stored in a "trust profile" that includes the ports and protocols that a network device is permitted to use in the course of executing its legitimate duties.

One benefit of embodiments described herein is that this "trustworthy" behavior is more readily and conveniently identified than identifying (again, belatedly) all malware signatures. Thus, the embodiments described herein improve the effectiveness of malware detection, and the security of networks. These improvements result in faster detection of untrustworthy events and allow proactive countermeasures to mitigate potential breaches before significant data is lost. The embodiments also reduce the computational and engineering resources needed to secure a network.

Another benefit of the described embodiments is that, in some examples, the trust profiles are not stored on servers (such as those being monitored), but rather on network monitors that monitor traffic transmitted through the network. Thus, even in an unlikely event that malware surreptitiously controls a server, the malware is still unable to access a trust profile stored on a network monitor. As a result, malware is unlikely to operate undetected because the malware is not able to identify and comply with the relatively few permissible behaviors identified in the trust profile. The use of network monitors also provides the ability to analyze packets in real-time (i.e., as they are transmitted or received (collectively described as "transceived")) without delaying traffic and to enable analysis of packets later using a separate device, thus adding packet analysis as a tool for monitoring whether a server is behaving in a trustworthy manner.

The embodiments described herein can be applied within an enterprise network to protect various network devices or outside the enterprise network to protect internet-facing servers. While the description and examples presented herein are in the context of servers and network infrastructure, the embodiments are applicable to any type of network device and/or client. Furthermore, while the term "malware" is used herein for convenience, it will be understood that embodiments of the present disclosure are applicable to any software or method used by a bad actor to compromise a network, device, or computer system. Also, the examples and embodiments described herein are set in the context of packet networks, the concepts presented herein are not limited to only packet networks but are applicable to any network of devices.

Example System

As described below, a network monitor is used to monitor a large number of hosts. The network monitors can be "in-line," such as those illustrated in FIG. 1. This type of network monitor, in some embodiments, uses tap points (passive monitoring of given switch ports) to copy data transmissions for analysis by a dedicated network monitor. A packet flow switch with port monitoring features can collect traffic in real time and redirect such collected traffic to a non-in-line network monitor. Packet flow switches, such as the nGENIUS 1500 produced by NetScout Systems, Inc. of Westford, Mass. are described in more detail in U.S. patent application Ser. No. 12/756,638, filed Apr. 8, 2010, and Ser. No. 13/647,503, filed Oct. 9, 2012, both of which are incorporated by reference herein in their entireties. In other embodiments, the term "network monitor" includes a TAP ("traffic access point") that copies data transmissions for analysis by a management server (as opposed to a server that functions as a network device and is monitored by embodiments disclosed herein) that uses a stored trust profile to evaluate the legitimacy of the traffic. In still other embodiments, a network monitor derives meta-data from a transmitted packet, which is then transmitted to a management server for analysis in the context of a trust profile.

Referring to FIG. 1, a network environment 100 includes a network 104, within which are a firewall/spam filter 108, network monitors 112A and 112B, trust profiles 114A and 114B, and network devices that, in this example, include a domain controller 116, and a web server 120. The domain controller 116 and the web server 120 are selected for illustration only and it will be understood that embodiments of the present disclosure are applicable to networks of various network devices that include servers, routers, clients, tablets, desktop and laptop computers, and other network devices. The network devices are connected by at least one network link 122.

The devices of the network 100 and various other devices and clients (not shown) of the network communicate with external devices and external networks through the firewall/spam filter 108. The firewall/spam filter 108 may also optionally contain other conventional malware detection and interference mechanisms. These conventional malware detection mechanisms include blacklists of prohibited senders, websites, or domains, whitelists of permitted senders, websites, and domains, malware signature databases and inspection tools, and other similar systems. While the firewall/spam filter 108 is shown in the network 100, the embodiments described herein are applicable even in the absence of a firewall/spam filter.

Network monitors 112A and 112B, as described above, passively monitor network traffic (i.e., data packets transmitted through links 122 to and from network devices) and analyze the traffic for various purposes. For example, network monitors analyze meta-data and content derived from transmitted packets to determine network performance. This is accomplished in some embodiments by generating and analyzing "ASRs" as described in U.S. Pat. No. 8,582,454, which is incorporated herein by reference in its entirety. As indicated above, a TAP in communication with a server is substituted for the network monitors 112A and 112B in some examples. In still other examples, the network monitors 112A and 112B collect meta-data associated with packets of a transmission and send the meta-data to a server for subsequent processing in accordance with the trust profile.

In this example, the network monitor 112B is also used to store a trust profile (optionally characterized as a "trust profile module" for convenience) for the web server 120 to identify whether the web server 120 is engaging in any malicious behavior. Correspondingly, the network monitor 112A is used to store a trust profile for the domain controller 116. As mentioned above, one benefit of storing the trust profile on a network monitor is that the trust profile is not visible to the associated network device and is thus protected from inspection by malware. The embodiments described herein depict a network monitor associated with a single device and a single network link 122. However, in other embodiments multiple transmission links 122 can each be tapped and routed into one or more network monitors.

In this example, the network monitor 112B applies the trust profile to network traffic transmitted both to and from the web server 120 without interrupting the traffic. Furthermore, as will be described below, the network monitor 112B performs packet inspection so that the permissible behavior of network devices is, optionally, continually refined.

While the above example depicts monitoring traffic between devices inside and outside a domain of an enterprise, the embodiments described here are equally applicable to monitoring traffic entirely within the domain of an enterprise. Indeed, the examples described herein are applicable to the generic case of monitoring traffic to and from a monitored device regardless of its destination. For example, an internet-facing web server is monitored to detect if malware is operating on that server. In another example, the internet-facing web server is protected by the network monitor in the event that the server is probed for vulnerability caused by, for example, a compromised client host. In this latter example, embodiments of the present disclosure provide an early warning of a security breach that is in progress.

In an example application of a trust profile to the system environment 100, the web server 120 is known to use only two ports—for example, ports 80 and 443—in the course of performing its legitimate tasks. These two ports are then identified in the trust profile 114B associated with the web server 120. In the event that the web server 120 sends packets from any port other than 80 and 443 (or other ports identified in the trust profile 114B), the network monitor 114B identifies the transmission as non-compliant with the trust profile and inconsistent with trustworthy behavior. Thus identified, the web server 120, and/or its transmissions, are analyzed to determine whether a policy violation has taken place or a legitimate use should be added to the trust profile (thus reducing future false positive indications of a policy violation).

In another example, because tasks and functions executed by specific servers are limited, the protocols used by a server can also be used to define permissible behavior of the server in an associated trust profile. For example, the web server 120 will use applications related to providing web pages to users. But upon infection, the web server 120 may begin, for example, mapping the network 104 by pinging connected servers and other network devices. Because this network mapping application is not a permissible protocol listed in the trust profile 114B, the ping will generate an alert prompting further investigation or remedial action, such as quarantining the server and/or its associated transmissions. In another specific example, if an application configured for serving web pages begins streaming encrypted, non-SSL packets, not identified as a permissible practice in the trust profile, this untrustworthy behavior will be identified for investigation.

In another example, if a client host attempts to access the web server 120 on a port not identified (and thus not permitted) by the trust profile, the attempt will be identified as untrustworthy and a corresponding alert will be generated. A client host attempting to access a server on an unexpected port is behavior that is typical of malware (or a remotely connected bad actor) exploring a potential vulnerability on a server port. Even in the event that the web server 120 is compromised, with proper time stamping used to correlate detected events across multiple devices of a network, the ability to trace the security breach to the first compromised client host provides indications of where the initial infection may have taken place because the untrustworthy access by the client will trigger an alert due to attempting to access a port not identified in the trust profile. Subsequently, if the infection of the web server 120 then leads to additional malware installed on that web server 120, then that malware will also trigger an alert when it uses ports not in the trust profile.

In addition to defining permissible behavior of a network device, in this case the web server 120, the trust profile 114B defines allowable exceptions to the ports and protocols. Allowable exceptions identify legitimate behavior that is otherwise not identified as permissible use. For example, the web server 120 will occasionally act as a client for receiving software updates. However, the permissible uses identified in the trust profile for the web server 120 do not include the server acting as a client even though receiving software updates is legitimate. An allowable exception in the trust profile 114B permits the web server 120 to act as a client by requesting software updates from a specific update server using a specific protocol and a specific port, all of which are identified in the trust profile. Similarly, a list of specific exceptions can be developed for each individual server that permits a server to behave in ways that are outside its primary operations (including anti-virus updates, patch managements, software updates, and others). In an alternative embodiment, the permissible use and allowable exception policies are combined into a single rule set containing rules relating to trustworthy usage of local and remote hosts, ports, and other characteristics. In this embodiment, if application of rules in the rule set identifies a packet as consistent with a legitimate use (as identified by a trust profile), then no alert is needed unless an optional acceptable business practice policy in the rule set indicates an exception to the trust profile. In this case, if a rule associated with acceptable business practice policy is violated, thus indicating that the behavior is not legitimate or trustworthy, then an alert is generated. Other specific features relating to the generation and application of trust profiles are described below.

In some embodiments some or all of the elements used to define permissible uses and/or allowable exceptions are extended to multiple network devices within a network. For example, if multiple network devices within a network receive software updates from a same IP address, then an allowable exception policy that is a set of allowable exception rules can be identified in the trust profile that are then applied to all of the corresponding network devices.

In one example, a management server (not shown) is used as a subsystem where all network monitor related data is centralized and stored, thus acting as a central "trust monitor." Statistics of trust profile violations for one or more devices can be summarized and displayed. A trust monitor also provides a means to quantify trust profile violations as a trust metric. An increase in violations leads to a decrease in the trust metric of a host. In an embodiment, the use of a trust metric could prevent the exfiltration of critical information in the event a server's trust profile was violated resulting in a decline in the associated trust value. All servers with a decreased trust value (e.g., decreased more than a defined amount or decreased at greater than a defined rate) could be identified for immediate attention if unknown data (typically encrypted) is transmitted from the server. In some embodiments, the management server provides a security dashboard showing the instantaneous state of trust within an enterprise. It can also show past connectivity between potentially compromised hosts with deep dive capabilities to research root cause possibilities. In other embodiments, trust profiles for all hosts are managed centrally on a management console providing centralized access. The management server can also store historical data and be used for search-driven analysis. Client hosts that attempt to access unapproved ports on server hosts with a trust profile can be quickly identified as a potential compromised client attempting to conduct reconnaissance or exploit a security vulnerability. This feature provides a unique early warning capability to an attack in progress well before the server vulnerability has been exploited. Hosts that have significant repeat violation incidents can be detected and analyzed for more persistent, hard-to-detect compromises. If the first instance of an alert starts at the server, an embodiment enables identification of the users and/or hosts that have accessed the server within a past time period. This "180 degree" view allows the security analyst to list the potential clients that may have caused the compromise of the server or identify potential hosts that may have subsequently been attacked.

Generating a Trust Profile and Trust Profile Elements

The use of network monitors (such as 112A and 112B in the example system 100 described above) to monitor and analyze packet traffic enables the behavior and performance a network to be gradually understood over time. This enables the methods described herein to be narrowly defined to protect against malware, but also to be adaptable as a network, and its function, evolves according to need. In some examples, using a network monitor to perform real-time packet analysis produces adaptive session records ("ASRs") as described in U.S. Pat. No. 8,582,454. These ASRs (or other packet analysis techniques) are used to identify legitimate (or trustworthy) behavior, detect allowable exceptions, and/or identify acceptable business practices that are not otherwise captured by the preceding two types of legitimate behavior definitions. Furthermore, through analysis of the network traffic over time, an increasing percentage (up to and including 100%) of permissible network function and network traffic can be identified using ASR tables listing the ports and protocols used by devices of the network, which are then optionally vetted.

Generating a trust profile begins with operational characterization of a given host (a server, for example). The initial stage of this operational characterization begins by identifying each task or action performed by the host, which are then used to create an initial usage profile. The usage profile contains information regarding the operation of a host including trustworthy and potentially untrustworthy behaviors. Any activities that are not defined as trustworthy (permitted) in the trust profile are assumed to be potentially untrustworthy. These potentially untrustworthy activities are further assessed and categorized. The process to assess the potentially untrustworthy activities (some or all of which could be trustworthy) provides a systematic analysis of network and network device activity to reduce (and possibly eliminate) false positive indications of untrustworthy activity. This process does not merely tighten or loosen statistical constraints, common with other types of malware detection algorithms, but rather is a root cause assessment of the source of untrustworthiness. The assessment is based on the known trustworthy operation of servers and other network devices, and is not based on the generally unknown behavior of malware or bad actors. Over time, the trustworthy behaviors can be made more specific (more secure) while conventional approaches of developing malware detection filters are merely best guesses and estimates that generally lag the actual development of the malware threats. The operational characterization of a host can be collected either manually or the host's network traffic can be monitored to create the usage profile.

A usage profile generally includes four traffic categories: 1) permissible/trustworthy use, 2) allowable exceptions, 3) insecure but permitted traffic, and 4) unknown traffic. Traffic in categories 3 and 4 are vetted (whether manually, automatically, or a combination of both) and reclassified into categories 1 or 2. Failing reclassification, traffic is presumed to be (or identified as) untrustworthy. In one embodiment, a traffic discovery tool provides the trace analysis for a typical system administrator (knowledgeable about the applications on the host) to make these determinations. In one embodiment, ASR data is used to collect usage profile information. Other automatic systems for collecting and organizing data are also applicable.

The usage profile is vetted to produce a trust profile. The trust profile defines permitted/trustworthy use by, for example, defining three policies: (1) "permissible use" which includes rules defining a set of ports and protocols that a host uses to perform legitimate tasks; (2) "allowable exceptions" which includes rules that identify use as legitimate that would otherwise be prohibited by the permissible use definitions; and (3) "acceptable business practices" which includes rules that, optionally, further refine permissible uses. Each action performed by a network device is verified as a member of at least one of these three policies through packet or flow-based inspection. In one embodiment, a trust profile can be stored and applied within the ASR structure although other methods of recording and applying a trust profile are also viable.

Identifying specific ports, protocols, and IP addresses for inclusion in the permissible use policy is helpful in identifying malware because malware is intended to remain undetected even after infection. Port usage, in one embodiment, can be a local port (i.e., the port on which the network device is "listening" to for in-bound traffic to the network device) or a remote port (i.e., the port to which the packet is forwarded up the protocol stack after it is received by the remote network device, e.g., the application at the remote (network or physical) location). Defining permissible ports and protocols is helpful for detecting malware because malware often uses ports and protocols on a compromised host not used by the host for its legitimate tasks. This malware technique helps the malware to avoid detection by not interfering with legitimate traffic. Thus, by understanding this malware strategy, embodiments of the present disclosure detect those applications and behaviors executed outside the trust profile that appeal to malware applications because they do not (or are not likely to) conflict or interfere with ports and protocols used by legitimate applications. Furthermore, any attempt to install malicious software that uses the same ports and protocols of a currently running application will often result in an application conflict, and thus potential detection from the resulting operational interruption or performance change of the legitimate application or traffic.

In addition to specific ports and protocols that are identified by rules in a permissible use policy of the trust profile for a given network device, an allowable exception policy includes rules that identify legitimate ports, protocols, IP addresses, and other network device tasks that would otherwise be prohibited by the permissible use definitions but are legitimate. Allowable exceptions include, but are not limited to, remote IP addresses, remote ports, local ports, and even remote universal resource locations (URLs). One case of allowable exceptions are those exceptions that permit a server host to operate as a client-host for specific services such as anti-virus updates, patch management, or other software maintenance functions, which would not otherwise be identified by the permissible use policy in the trust profile.

While it is unlikely that a malware infection can circumvent the permissible use and allowable exception policies of a trust profile without causing some other noticeable traffic disruption, it is still technically feasible. To address this possibility, as well as to monitor the use of infrequent but necessary port usage (where the opportunity to detect any application conflict may be rare), another optional component of a trust profile defines "acceptable business practices." Acceptable business practices further refine permissible use by applying additional rules to tasks otherwise identified as permissible by one or more of the permissible use and allowable exception policies. Defining acceptable business practice rules in a trust profile provides an optional deep packet inspection by a network monitor of the permissible use (but still possibly malicious) traffic to ensure that traffic is truly legitimate.

Acceptable business practice rules can come in many forms. In one embodiment, acceptable business practice rules can constrain time-of-day access, data volume transmission limits, tunneling of one protocol within another protocol, and presence of URL indicators (outside of a whitelist of approved URLs). Another class of acceptable business practice examples includes periodic detection of known "whitelist tags" associated with a particular traffic flow to ensure that the application is behaving properly. Some example embodiments of whitelist tags include the following: 1) identified XML tags in web pages, 2) identified SQL terms for database queries and responses, 3) watermark or other header information contained in documents, and 4) specific meta-data designed to track critical file or data transfers. Bad actors would typically not know what these whitelist tags are. Attempts to exfiltrate documents that have been encrypted would be detected because the corresponding tags would not be detected as part of the acceptable business practice that has been set up for transfer of critical documents from certain servers, for example.

Another embodiment of an acceptable business practice rule includes binding or associating use of an identified host by an identified user. Assuming a host is considered a single user host (i.e., a personal computer versus a server), acceptable business practice rules could limit use of other user credentials on specific hosts (or servers). For example, such rules would detect use of stolen user credentials on a host. In an example, should a malware attempt successfully access an active user directory of an enterprise and retrieve usernames and passwords associated with system administrators, the malware operators could control the network hosts without detection. However, should administrator credentials be used on a host that is not bound to the particular administrator credential used by the malware operators, an alert would be triggered identifying the possible breach of the credentials as well as the corresponding host that was used.

Another embodiment of acceptable business practice rules are those that provide protection of the enterprise infrastructure from attacks by bad actors that have gotten access to the network through one or more compromised hosts. Since most users have no need to directly communicate with certain infrastructure devices such as routers, switches, and certain servers, any such attempts to do so could be construed as outside acceptable business practices. Routers, switches, and other infrastructure devices also suffer from unknown vulnerabilities or poor security practices. Once inside the enterprise network, a bad actor could exploit such devices (assuming the vulnerability or exploit exists), modify the device, establish and maintain presence on that device for long durations. An acceptable business practice policy that prevents general users from directly accessing infrastructure removes this avenue of attack for malware without requiring any knowledge of the particular infrastructure vulnerabilities or malware attack methods, thus overcoming a drawback of signature-based malware countermeasures.

Figure 2A:
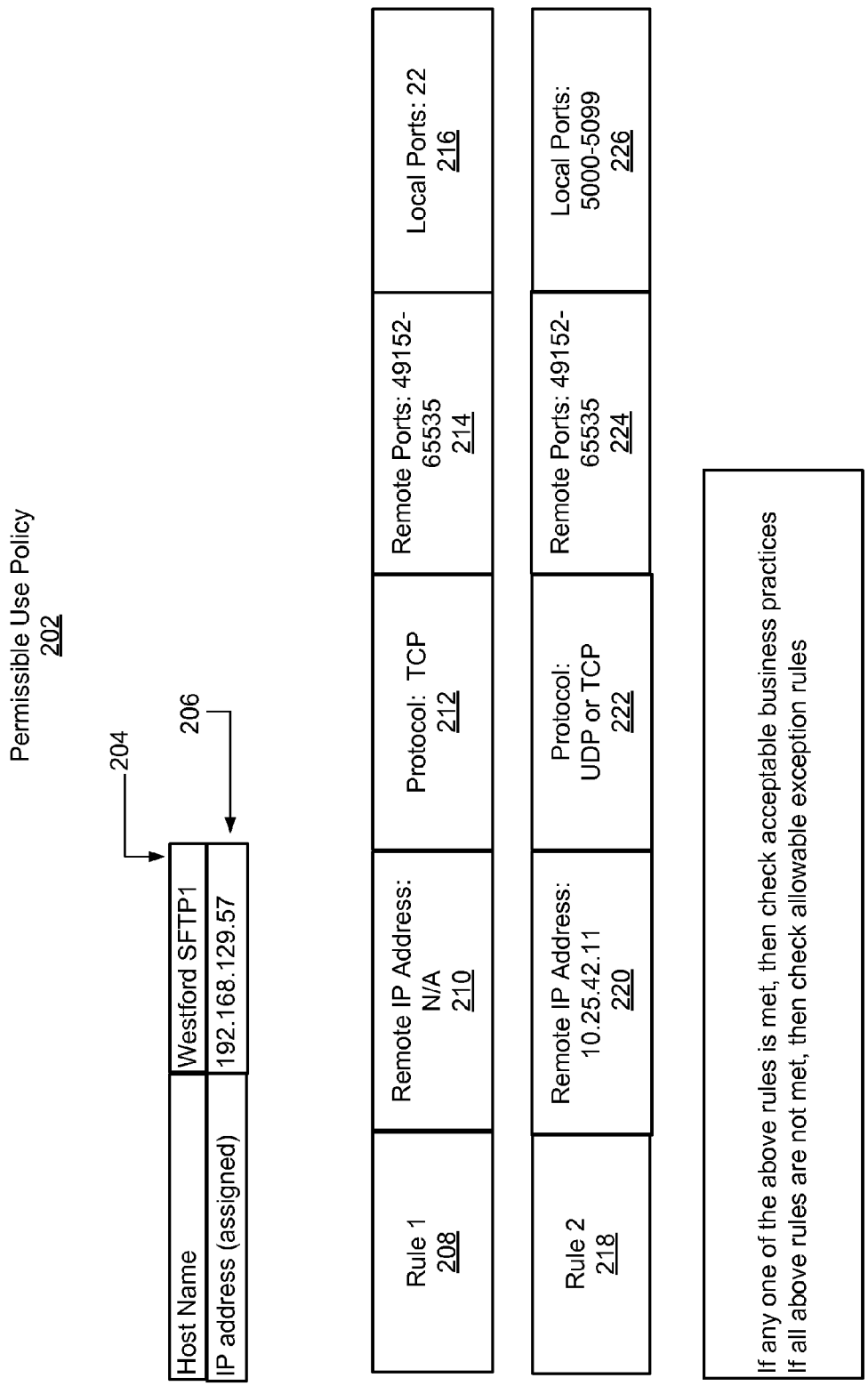
FIG. 2A is a graphical illustration of network parameters used to generate a trust profile establishing permissible use of a network device, in an embodiment.

FIGS. 2A, 2B, and 2C, provided only for convenience of explanation, are graphical illustrations of trust profiles that include various elements and parameters described above. The trust profile 200 includes a permissible use policy 202 shown in FIG. 2A. The permissible use policy 202 identifies a host 204 and an assigned IP address 206 to which the trust profile applies. The permissible uses 202 of the trust profile 200 has two permissible use rules 208, 218, each of which identifies several parameters. For a packet to be identified as legitimate per the permissible use policy 202, all parameters in at least one of the rules 208, 218 must match data of the packet. If the data of the packet does not match all parameters in at least one rule, then allowable exceptions are checked.

In the embodiment of the permissible use policy 202 shown in FIG. 2A, Rule 1 208 includes the following parameters: a permissible protocol (TCP) 212, permissible remote ports (49152-65535) 214, and a permissible local port (22) 216. Rule 2 218 included in the permissible use policy 202 provides an example of a second rule that is applied as part of the permissible use policy 202. The parameters identified in rule 218 include a remote IP address 220, protocol 222, remote ports 224, and local ports 226. These rules and the corresponding parameters are provided for only illustration. As many rules as necessary can be incorporated to define trustworthy behavior for a network device, such as the host identified in 204. As mentioned above, if all parameters in any one of the one or more rules match data in a packet, then the packet under evaluation is considered initially trustworthy (pending acceptable business practice constraints). If the packet is evaluated as initially trustworthy according to the permissible use policy 202, then in some embodiments the acceptable business practices are used to further evaluate the packet. If the packet is not evaluated as trustworthy according to the permissible use policy 202, then allowable exceptions may be used to further evaluate the packet.

FIG. 2B is a graphical illustration of allowable exceptions 230 to the permissible use policy 202. The allowable exceptions 230 apply to host 204 and local IP address 206 as shown in FIG. 2A. Allowable exceptions 230 of the trust profile include, in this example, two rules 236, 246, each of which identifies one or more parameters that are compared to transceived packets. As presented above in FIG. 2A, all of the identified parameters in a rule must match data in a transceived packet for an otherwise untrustworthy packet to be identified as initially trustworthy using the allowable exceptions 230. For example, in one embodiment, at least one port transmitting the data packets must match a permissible port identified in the trust profile. In another embodiment, at least one protocol generating the data packets must match a permissible protocol identified in the trust profile.

Rule 1 236 includes a remote IP address (10.25.35.45) 238, a protocol (TCP) 240, a remote port (22) 242, and a local port (49152-65535) 244. Rule 2 246 is another example of an allowable exception analogous to Rule 1 236 and, compared to Rule 1 236, includes different values for remote IP address, protocol, and remote ports but a same value for local ports. However, in other examples any of these values can be the same or different from those defined in Rule 1 236. Additional rules 248 in the allowable exception policy 230 are optionally included to identify services commonly used by one or more servers in an enterprise network for legitimate activities. Examples of these services include, but are not limited to, domain names services (DNS), authentication services (AUTH), and single sign on services (SSO). The additional rules 248 simplify configuration of a trust profile 200 because the same set of ports/protocols (or other services) used across an entire enterprise network need not be repeatedly entered for each network device. If any additional rules 248 are found in a transceived packet, then the packet is considered initially trustworthy until a subsequent evaluation of acceptable business practice policy is conducted. If, when a packet is evaluated by the trust profile, both permissible use policy and allowable exception policy indicate that the packet is not trustworthy, then a policy violation is generated. In an implementation, both permissible use rules and allowable exception rules may be evaluated during the same process step.

FIG. 2C is a graphical illustration of an acceptable business practice policy 250 of the trust profile 200 applied to host 204 and local IP address 206. The acceptable business practice policy 250 optionally defines at least one rule, but in the example shown defines six rules. Unlike the permissible use policy 202 and the allowable exceptions policy 230, the acceptable business practice profile 250 requires that all of the rules in the policy be met by transceived packets for packets otherwise identified as initially trustworthy to remain classified as trustworthy. That is, if one rule within the acceptable business practice profile 250 is not met by the transceived packet, the packet is identified as untrustworthy. Rule 1 252 is a specific embodiment that is an exception to the requirement that all rules of the allowable exceptions policy 230 to be met. In this case, rule 1 252 permits a list of IP addresses of remote hosts to be exempt from all other rules of an acceptable business practice policy 250. The other optionally implemented rules include rule 2 254, which defines an upper limit on data transfer to a single client, rule 3 258 which defines a data transfer rate from a server, rule 4 262 which defines legitimate hours of operation, rule 5 which defines further restrictions on remote domains (not otherwise limited in permissible use), and rule 6 which defines remote access restrictions 270. These are examples of acceptable business practices provided for illustration only. Other acceptable business practices specific to a particular enterprise or domain can be implemented to further refine permissible uses of the corresponding network and any number of rules may be used to form an acceptable business practice policy such as policy 250.

Figure 3A:
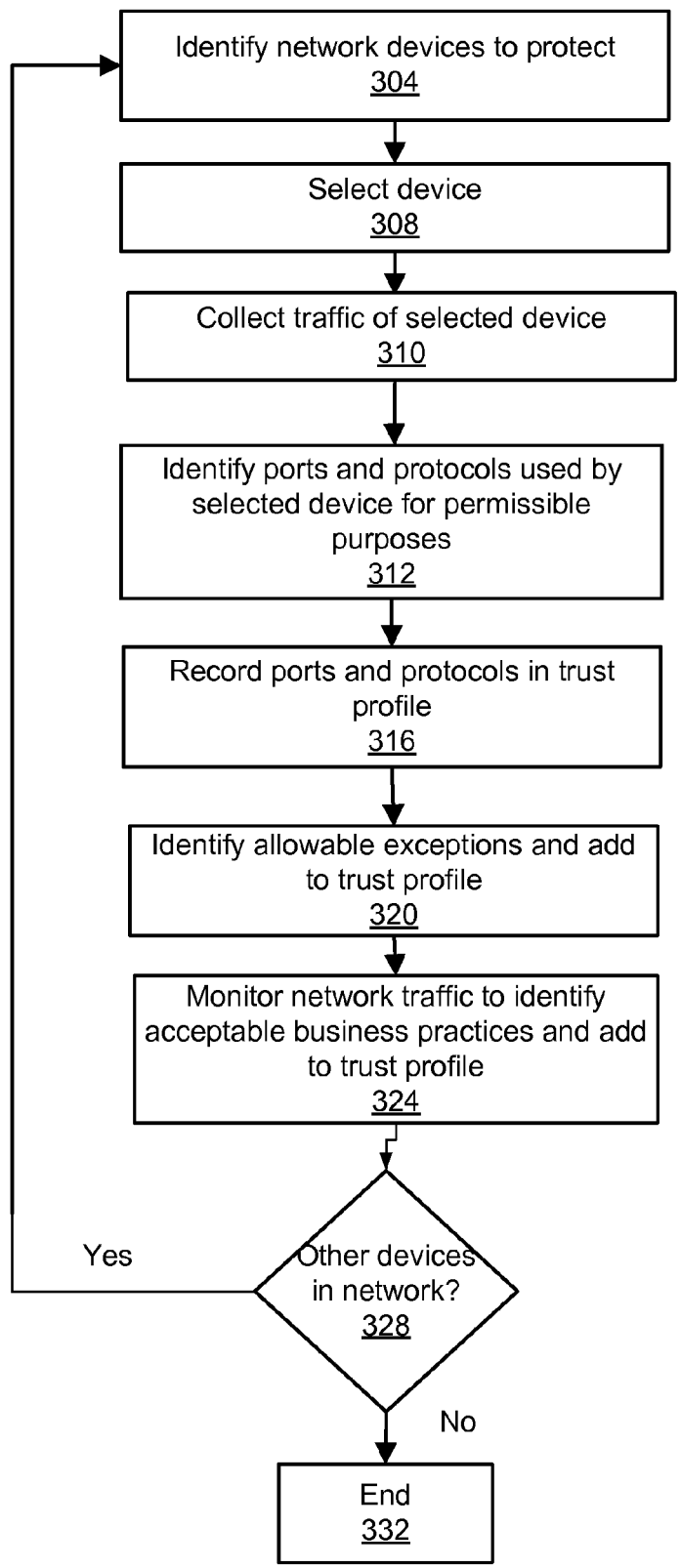
FIG. 3A is a method flow diagram for creating a trust profile for one or more network devices, in an embodiment.

FIG. 3A illustrates a method flow diagram of a method 300 for creating a trust profile for one or more network devices. A set of network devices is identified 304 to protect using trust profiles. A device is selected 308 as a starting point. During a discovery phase, a network monitor collects 310 traffic for each selected network device. As traffic is monitored, metadata regarding IP addresses, port and protocol usage is analyzed by the network monitor or alternatively sent to a management server for analysis. Traffic collection and analysis 310 may last minutes or weeks.

Port and protocols (among other criteria described above) used by the selected device are identified 312 and those corresponding to permissible uses are recorded 316 in a trust profile that is stored in a network monitor. Allowable exceptions to impermissible uses, as described above, are identified and added to the trust profile 320 as permissible. Network traffic is then, optionally, monitored to identify acceptable business practices 324, which are then also added to the trust profile to further define the permissible uses. Alternatively, a trust profile may be defined by assigning a set of ports and protocols (and allowable exceptions) to a particular network device absent collection and analysis of traffic.

If other devices are in the network and are determined 328 to warrant protection using a trust profile, then the process is repeated for each device. Otherwise, the process ends 332. Pre-structured trust profiles can be provided and executed by a corresponding device that monitors traffic, whether a server, network monitor, or other network device configured to monitor traffic according to the trust profile. These "out of the box" profiles provide a template for building a trust profile based on industry best practices for ports needed for sample infrastructure devices (for example Exchange Server, DNS, Web Server).

Figure 3B:
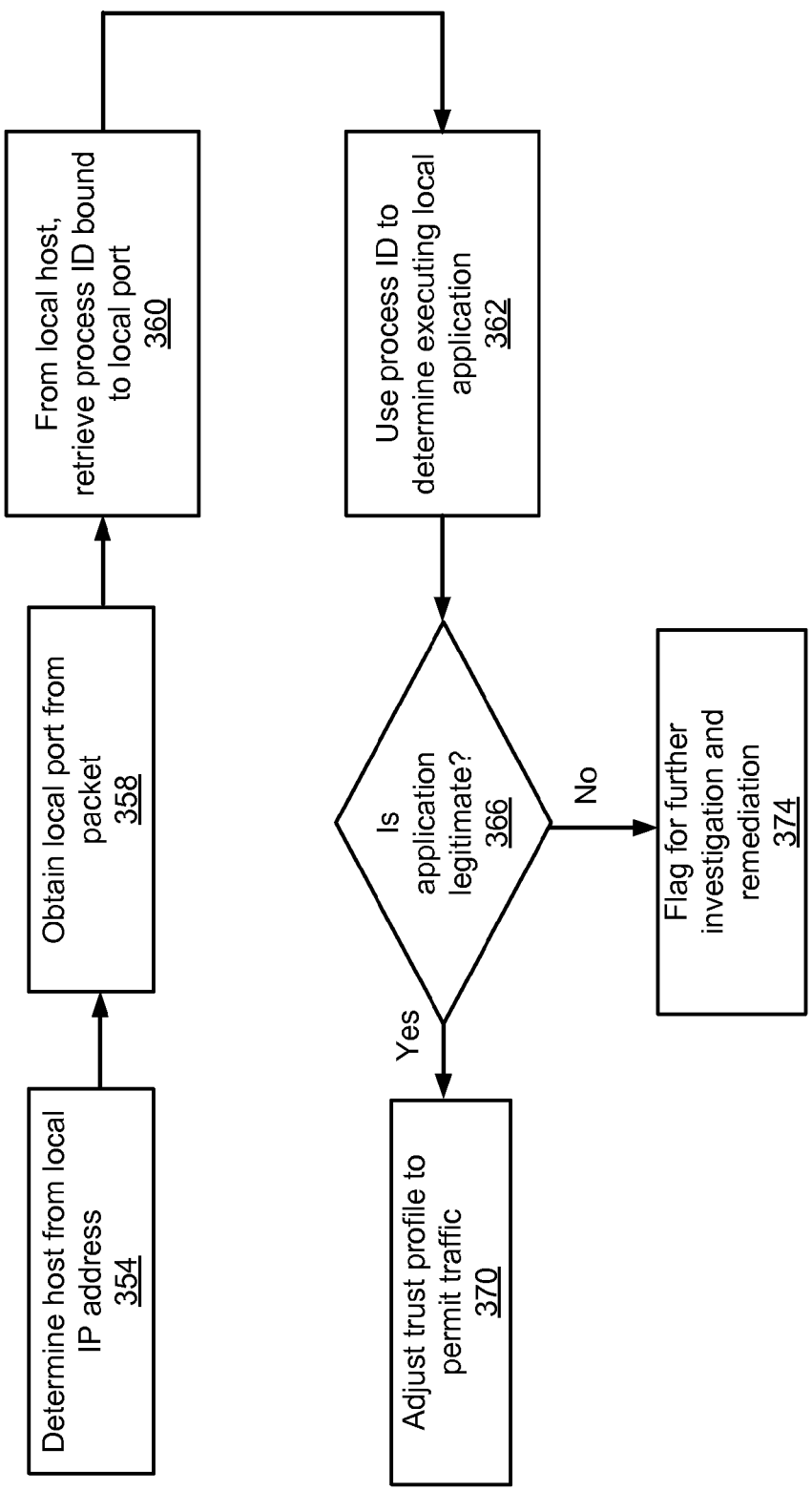
FIG. 3B is a flow diagram for an example method for detecting and analyzing network traffic and updating a trust profile responsive to the analysis, in an embodiment.

FIG. 3B is an example method 350 by which network traffic that has yet to be identified as either trustworthy or untrustworthy is analyzed, vetted, and a corresponding trust profile is updated responsive to the analysis. In some examples, the method 350 is applied in various stages of the method 300 to facilitate traffic analysis. Execution of the method 350 enables the system (or a system administrator) to understand all network traffic that is transmitted through a network.

In response to a received a data packet (or other transmission), a network monitor executing the method 350 identifies 354 a local IP address of the packet that corresponds to a local host. The network monitor identifies a local port 358 of the packet corresponding to the host's process identity. A utility such as NETSTAT® (for MICROSOFT® WINDOWS®) is used in some examples to identify a local port to process identity association 360. The process identity is then used to identify the executing application 362 on the local host. A utility such as the WINDOWS® task manager is used to identify which applications have created a particular process. The application is then determined 366 to either be part of a legitimate application or alternatively, an application that is not trustworthy. If legitimate, the corresponding trust profile is updated 370. If the traffic is not trusted or still unknown to be trustworthy, the packet and corresponding analysis is flagged 374 for further analysis.

Applying a Trust Profile

Figure 4:
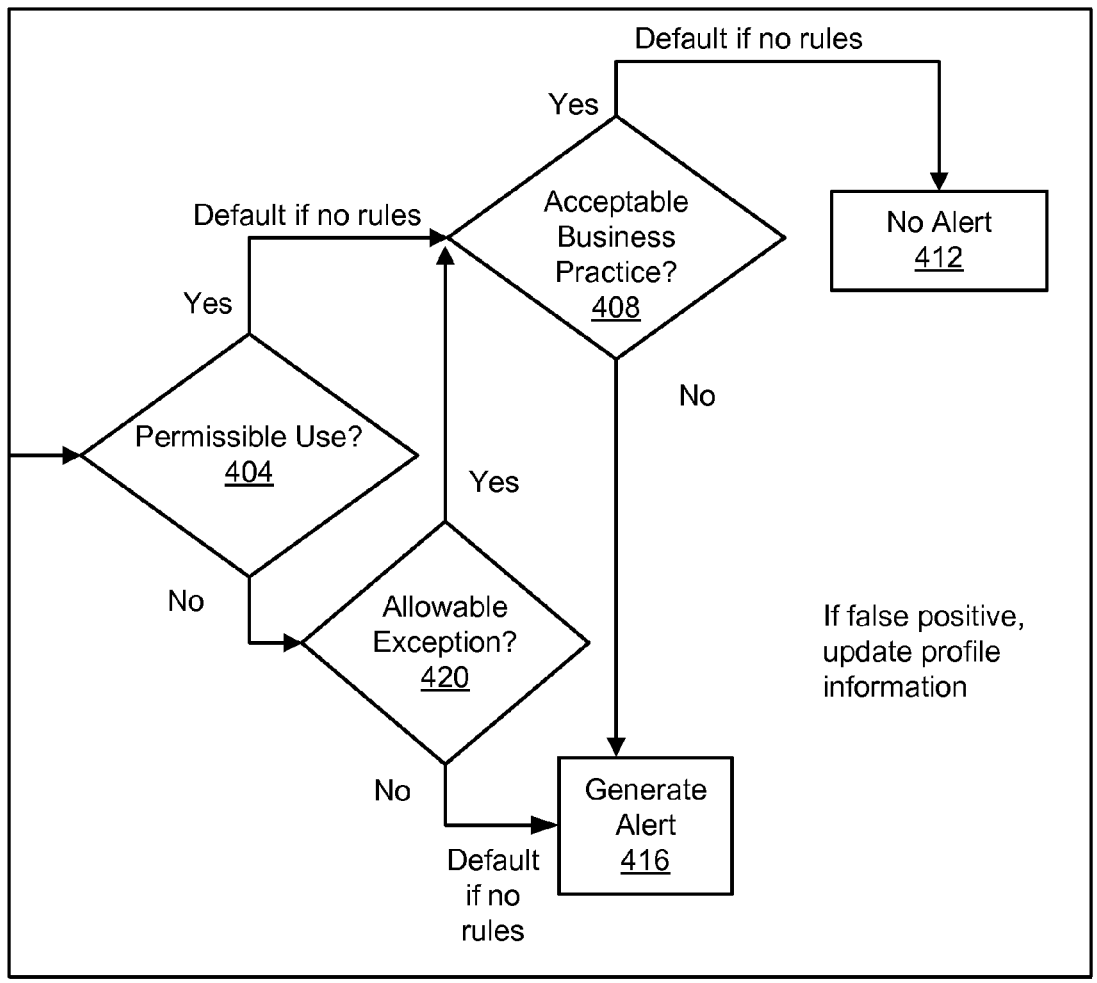
FIG. 4 is a method flow diagram for identifying and responding to anomalous network device behavior, in an embodiment.

FIG. 4 is a method flow diagram of a method 400 for identifying and responding to anomalous network device behavior. Network traffic, whether transmitted as a packet or otherwise, is received. Using a trust profile, a system (e.g., a network monitor) determines 404 whether the traffic complies with definitions in a permissible use parameter of a trust profile (e.g., local and/or remote ports, protocol, local and/or remote IP address). As indicated above in the context of FIG. 2A, all parameters identified in at least one of the rules of the permissible use policy must be met for behavior to be identified as trustworthy. If the traffic does comply with the permissible uses of the trust profile, the system determines 408 whether the traffic complies with an acceptable business practice, thus further refining the permissible uses. As described above, while optional, acceptable business practices are useful for detecting traffic that uses permissible ports and protocols but nevertheless is not legitimate. For example, an acceptable business practice is whether a web server is permitted to stream encrypted non-SSL data. If the business practice is acceptable, then no alert is generated 412. If the business practice is not acceptable, then an alert is generated 416. As indicated above in the context of FIG. 2C, all rules of the acceptable business practice policy must be met (with the exception of policies that include rule 1 252 as shown in FIG. 2C) for behavior to be identified as trustworthy.

Returning to the determination 404, if permissible uses and allowable exceptions are defined, and the traffic is determined 404 to not comply with permissible use parameters of the trust profile, the system determines 420 whether the traffic fits an allowable exception (e.g., a server acting as a client for software updates). As indicated above in the context of FIG. 2B, all parameters identified in at least one of the rules of the allowable exception policy must be met for behavior to be identified as trustworthy. If it is an allowable exception then, as above, the traffic is checked to see if it is compliant with acceptable business practices 408. If it is an allowable exception and compliant with acceptable business practices 408, then no alert is generated 412. But if the traffic is not an allowable exception or does not comply with acceptable business practices, then an alert is generated 416.

Alerts generated by identification of traffic unknown to be trustworthy (or otherwise not compliant with a trust profile) provide information regarding the local and remote IP addresses, port and protocol usage, and specific profile violation statements. Should such an alert prove to be a false positive, all information regarding the alert is available for immediate remediation—either to modify the trust profile (permissible use, allowable exception, or acceptable business practice) or to place the event into the vetting process where further analysis may be needed to determine what local application generated that untrustworthy traffic. The use of a discovery tool (described above) makes this process more efficient than manual investigation.

Ultimately, trust profiles and a trust monitoring system reduce false positive alerts such that all alerts have actionable meaning. The methodology for vetting false positives is an element to managing and proactively reducing such events. This improves the operation of networks as a whole, and individual network devices used to provide security to the network.

At the same time, performance of the methods 300, 350, and 400 facilitate understanding of applications and traffic, allowing more sophisticated acceptable business practice rules to be developed over time. Activities such as protocol tunneling can be made more detectable as well as the detection of transmitted encrypted traffic over approved protocols (a common technique for exfiltrating sensitive data from enterprises). Instead of focusing on the threat and vulnerabilities, using trust monitor allows enterprises to focus on their application behaviors. By constraining the network to operate within those application behavioral boundaries (typically unknown to bad actors), trust monitoring makes it difficult for bad actors to operate within the enterprise without detection. Even if the bad actors have stolen credentials, further attempts to install malicious software would be detected (operating outside the trust profile) and traced back to the compromised host and user credentials (using standard log file monitoring).

Computing Machine Architecture

Figure 5:
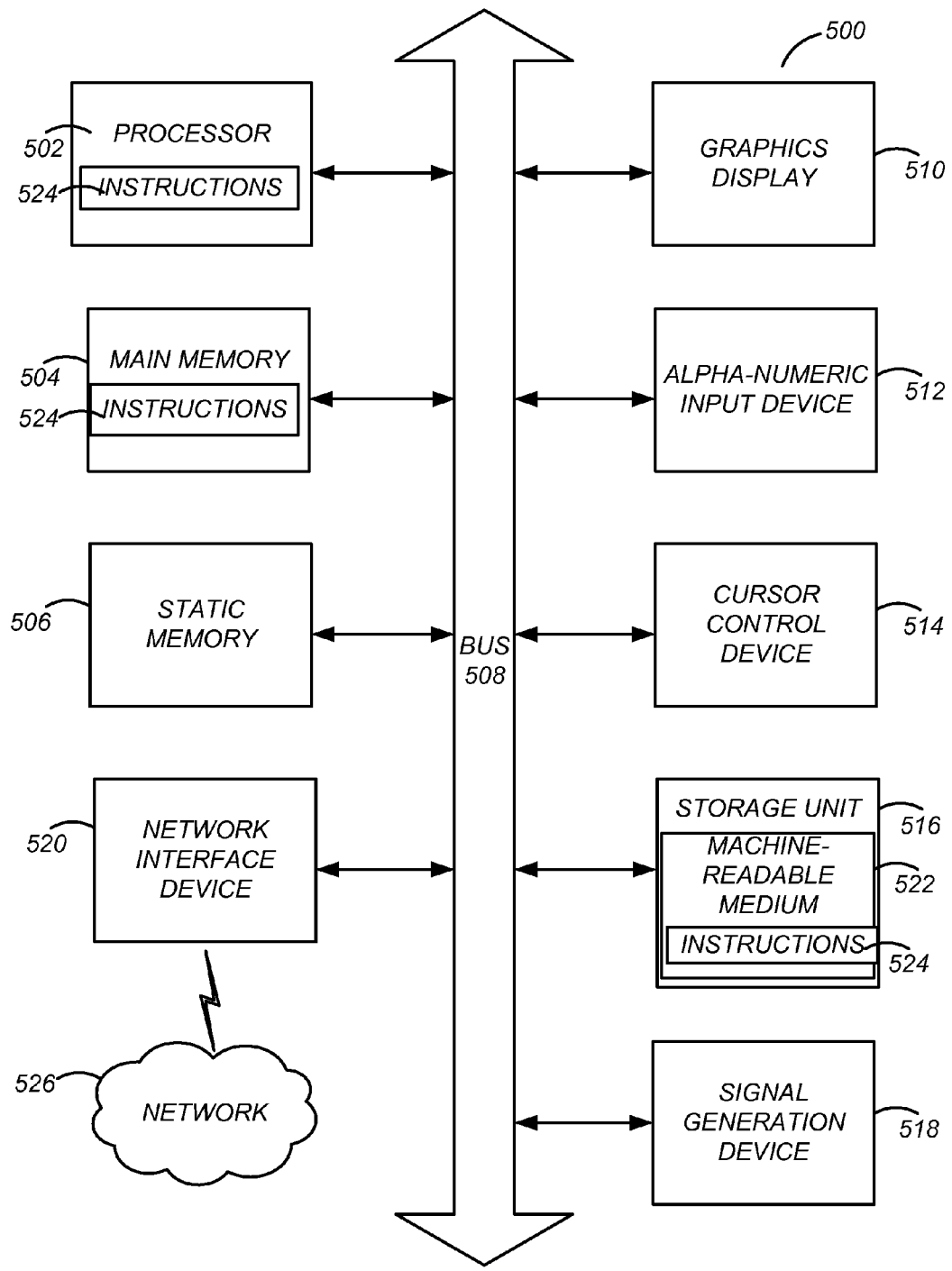
FIG. 5 illustrates components of an example machine able to read instructions from a machine-readable medium and execute those instructions in a processor.

FIG. 5 is a block diagram illustrating components of an example machine able to read instructions from a machine-readable medium and execute those instructions in a processor to perform the machine processing tasks discussed herein, such as the engine operations discussed above. Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a data store 516, a signal generation device 518 (e.g., a speaker), an audio input device 526 (e.g., a microphone) and a network interface device 520, which also are configured to communicate via the bus 508.

The data store 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network (not shown) via network interface 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 5. Alternatively, hardware or software modules may be stored elsewhere within a computing system.

As referenced herein, a computer or computing system includes hardware elements used for the operations described here regardless of specific reference in FIG. 5 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience. This description should be read to include one or at least one and the singular also includes the plural unless it is obvious that it is meant otherwise. Upon reading this disclosure, those of skill in the art will appreciate still additional alternative structural and functional designs for a system and a process for providing machine processing of resource allocations in response to a catastrophic event through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A system comprising:
    a network monitor analyzing data packets transmitted through a network;
    a trust profile module in communication with the network monitor that includes a trust profile, the trust profile module configured for:
        determining permissible use that includes at least one of:
            whether the at least one port transmitting the data packets matches a permissible port identified in the trust profile; and
            whether the at least one protocol generating the data packets matches a permissible protocol identified in the trust profile;
        determining a set of allowable exceptions to the permissible use including identifying a server and allowing the server to operate as a client for obtaining software updates from an update server; and
        when a communication is determined to be one of a permissible use or an allowable exception, determining whether the communication is one of a set of acceptable business practices.

2. The system of claim 1, wherein the network monitor further comprises a server.

3. The system of claim 1, wherein the permissible port comprises at least one of a local port and a remote port.

4. The system of claim 1, wherein the trust profile module is further configured for generating an alert indicating violation of the trust profile.

5. The system of claim 1, further comprising:
    performing, by the network monitor, a packet inspection on transmitted data packets; and
    responsive to the packet inspection, determining whether the inspected packets comply with the acceptable business practices of the trust profile.

6. The system of claim 1, wherein the acceptable business practices comprise identifying as legitimate at least one of a time-of-day access, a data volume transmission limit, and protocol tunneling.

7. A computer-implemented method comprising:
    receiving a trust profile corresponding to a first network device the trust profile including permissible use rules and acceptable business practices, at least one of the permissible use rules identifying at least one of (1) a permissible port and (2) a permissible protocol for transceiving legitimate network traffic by the first network device;
    storing the trust profile at a second network device that monitors network traffic corresponding to the first network device;
    identifying, by the second network device, at least one of (1) an actual port used to transceive network traffic by the first network device and (2) an actual protocol used to generate network traffic by the first network device;
    identifying if at least one of the permissible use rules is satisfied, by determining the second network device, whether the at least one of (1) the actual port and (2) the actual protocol matches the at least one of (1) the permissible port and (2) the permissible protocol of the trust profile; and
    if the network traffic satisfies at least one of the permissible use rules, determining whether the network traffic also satisfies at least one of the acceptable business practices.

8. The computer-implemented method of claim 7, further comprising:
    responsive to determining that the at least one of (1) the actual port and (2) the actual protocol do not match a corresponding one of the at least one of (1) the permissible port and (2) the permissible protocol of the trust profile, preventing the first network device from transceiving the network traffic.

9. The computer-implemented method of claim 7, wherein receiving the trust profile comprises receiving a usage profile, the received usage profile generated by:
    monitoring traffic corresponding to the first network device during a discovery phase;
    receiving an identification of at least one of (1) a set of actual ports used by the first network device to transceive network traffic and (2) a set of actual protocols used by the first network device to generate network traffic; and
    receiving an identification of at least one of (1) the permissible port from the set of actual ports and (2) the permissible protocol from the set of actual protocols for inclusion in the trust profile.

10. The computer-implemented method of claim 7, wherein the trust profile further comprises at least one permitted IP address.

11. The computer-implemented method of claim 7, wherein the received trust profile further comprises a set of allowable exceptions corresponding to the first network device for permitting network traffic not otherwise identified in the trust profile as legitimate.

12. The computer-implemented method of claim 11, wherein the allowable exceptions includes identifying a server operating as a client for obtaining software updates from an update server.

13. The computer-implemented method of claim 11, further comprising:
determining whether the network traffic also satisfies an acceptable business practice corresponding to the first device if the network traffic is determined to satisfy at least one of the allowable exceptions.

14. The computer-implemented method of claim 7, further comprising performing, by the second network device, a packet inspection on the network traffic corresponding to the first network device to determine whether the traffic complies with the acceptable business practices.

15. The computer-implemented method of claim 14, wherein the acceptable business practices includes at least one of a time-of-day access, a data volume transmission limit, and protocol tunneling that are identified as legitimate.

16. The computer-implemented method of claim 14, wherein the acceptable business practices include whitelist tags corresponding to the network traffic that are identified as legitimate.

17. The computer-implemented method of claim 7, wherein the acceptable business practices include associating legitimate user credentials with a server.

18. A computer-implemented method comprising:
storing a trust profile at a network monitor, the trust profile including permissible use rules and acceptable business practices, the permissible use rules identifying legitimate traffic by at least one of (1) a permissible port and (2) a permissible protocol;
identifying, by the network monitor, at least one of (1) an actual port used to transceive network traffic and (2) an actual protocol used to generate network traffic;
identifying if at least one of the permissible rules is satisfied by determining, by the network monitor, whether the at least one of (1) the actual port and (2) the actual protocol matches the at least one of (1) the permissible port and (2) the permissible protocol of the trust profile; and
if the network traffic satisfies at least one of the permissible use rules, determining, by the network monitor, whether the network traffic satisfies at least one of the acceptable business practices.

19. The computer-implemented method of claim 18, wherein the trust profile further comprises a set of allowable exceptions corresponding to the first network device for permitting network traffic not otherwise identified in the trust profile as legitimate.

20. The computer-implemented method of claim 19, wherein the allowable exceptions includes identifying a server operating as a client for obtaining software updates from an update server.

21. The computer-implemented method of claim 18, further comprising:
determining whether the network traffic also satisfies an acceptable business practice corresponding to the first device if the network traffic is determined to satisfy at least one of the allowable exceptions.

* * * * *